(12) United States Patent
Ahn et al.

(10) Patent No.: US 7,759,272 B2
(45) Date of Patent: Jul. 20, 2010

(54) PREPARATION METHOD OF CATALYST FOR ETHYLENE POLYMERIZATION AND COPOLYMERIZATION

(75) Inventors: Jin-Kyu Ahn, Seoul (KR); Joon-Ryeo Park, Seoul (KR); Chun-Byung Yang, Daejeon (KR); Jong-Sik Kim, Daejon (KR)

(73) Assignee: Samsung Total Petrochemicals Co., Ltd., Seosan-shi, Chungcheongnam Province (KR)

( * ) Notice: Subject to any disclaimer, the term of this patent is extended or adjusted under 35 U.S.C. 154(b) by 0 days.

(21) Appl. No.: 12/274,069

(22) Filed: Nov. 19, 2008

(65) Prior Publication Data

US 2009/0215611 A1 Aug. 27, 2009

(30) Foreign Application Priority Data

| Feb. 26, 2008 | (KR) | ...................... 10-2008-0017292 |
| Feb. 26, 2008 | (KR) | ...................... 10-2008-0017293 |

(51) Int. Cl.
*B01J 31/06* (2006.01)
(52) U.S. Cl. ...................................... 502/111; 585/524
(58) Field of Classification Search ................. 502/111; 585/524
See application file for complete search history.

(56) References Cited

U.S. PATENT DOCUMENTS

| 3,642,746 | A |   | 2/1972  | Kashiwa et al. |
| 4,330,649 | A |   | 5/1982  | Kioka et al. |
| 4,336,360 | A |   | 6/1982  | Giannini et al. |
| 4,347,158 | A |   | 8/1982  | Kaus et al. |
| 4,422,957 | A |   | 12/1983 | Kaus et al. |
| 4,425,257 | A |   | 1/1984  | Miro et al. |
| 4,451,688 | A | * | 5/1984  | Kuroda et al. ................ 585/524 |
| 4,477,639 | A |   | 10/1984 | Nielsen |
| 4,485,035 | A | * | 11/1984 | Shiga et al. .................. 502/115 |
| 4,518,706 | A |   | 5/1985  | Gessell |
| 4,618,661 | A |   | 10/1986 | Kaus et al. |
| 4,680,381 | A |   | 7/1987  | Asada et al. |
| 4,816,433 | A |   | 3/1989  | Terano et al. |
| 4,829,037 | A |   | 5/1989  | Terano et al. |
| 4,847,227 | A |   | 7/1989  | Murai et al. |
| 4,970,186 | A |   | 11/1990 | Terano et al. |
| 5,106,807 | A |   | 4/1992  | Morini et al. |
| 5,130,284 | A |   | 7/1992  | Terano et al. |
| 5,264,088 | A | * | 11/1993 | Brusson et al. ............. 585/512 |
| 5,459,116 | A |   | 10/1995 | Ro et al. |
| 5,578,541 | A | * | 11/1996 | Sacchetti et al. ............ 502/126 |
| 5,633,419 | A | * | 5/1997  | Spencer et al. .............. 585/522 |
| 6,620,758 | B1 | * | 9/2003 | Lindroos et al. ............ 502/110 |

* cited by examiner

*Primary Examiner*—Stuart Hendrickson
*Assistant Examiner*—Michelle Hou
(74) *Attorney, Agent, or Firm*—Barlow, Josephs & Holmes, Ltd.

(57) ABSTRACT

Provided is a preparation method of a catalyst for ethylene (co)polymerization, comprising the following steps: (1) preparing a magnesium compound solution by contact-reacting a halogenated magnesium compound with a mixed solvent of cyclic ether and at least one alcohol; (2) reacting the resulted magnesium compound solution from the above step (1) with a silicon compound having at least one alkoxy group; (3) preparing a support by adding a titanium compound to the resulted product from the step (2); and (4) reacting thus obtained support with a titanium compound and optionally a monoester compound, resulting in a catalyst. Catalysts prepared according to the present invention have a regulated particle shape, and their particle size can be easily adjusted. Therefore, with such catalyst, it is possible to produce polymers having high bulk density at high production yield.

8 Claims, No Drawings

PREPARATION METHOD OF CATALYST FOR ETHYLENE POLYMERIZATION AND COPOLYMERIZATION

TECHNICAL FIELD

The present invention relates to a preparation method of a catalyst for ethylene (co)polymerization, specifically to a method comprising the steps of: (1) preparing a magnesium compound solution by contact-reacting a halogenated magnesium compound with a mixed solvent of cyclic ether and at least one alcohol; (2) reacting the resulted magnesium compound solution from the above step (1) with a silicon compound having at least one alkoxy group; (3) preparing a support by adding a titanium compound to the resulted product from the step (2); and (4) reacting thus obtained support with a titanium compound and optionally a monoester compound, resulting in a catalyst. Catalysts prepared according to the present invention have a regulated particle shape, and their particle size can be easily adjusted. Therefore, with such catalyst, it is possible to produce polymers having high bulk density at high production yield.

BACKGROUND ART

Magnesium-containing catalysts for ethylene (co)polymerization have been well known to provide significantly high catalytic activity and polymers having high bulk density, and also to be suitable for liquid and gas phase polymerization. Liquid phase polymerization of ethylene refers to a polymerization process conducted in bulk ethylene or a medium such as isopentane or hexane. In such liquid phase polymerization, catalyst properties such as high activity, shape, size, size distribution, bulk density, content of low molecular weight components that can be dissolved in a medium and the like are considered important, in terms of process applicability.

In the field of art where the present invention belongs, a variety of catalysts for olefin polymerization which contain magnesium and are based on titanium, and preparation processes thereof have been known. Particularly, many methods using a magnesium solution for obtaining a catalyst for olefin polymerization, which has high bulk density as mentioned above, have been known. There are methods for obtaining a magnesium compound solution by reacting a magnesium compound with an electron donor such as alcohol, amine, cyclic ether, organic carboxylic acid and the like, in the presence of a hydrocarbon solvent, for example, U.S. Pat. Nos. 3,642,746, 4,336,360, 4,330,649 and 5,106,807 wherein methods using alcohols are described. Further, many methods for preparing a magnesium-supported catalyst by reacting such liquid magnesium solution with a halogen compound such as titanium tetrachloride have been known in this field. Catalysts obtained from such methods of prior art, may provide high bulk density, however they are still needed to be improved in terms of catalytic activity or hydrogen reactivity. With respect to this, U.S. Pat. Nos. 4,477,639 and 4,518,706 describe inventions using tetrahydrofuran, i.e. cyclic ether, as a solvent for a magnesium compound.

U.S. Pat. Nos. 4,847,227, 4,816,433, 4,829,037, 4,970,186 and 5,130,284 describe methods for preparing a catalyst for olefin polymerization, which has excellent polymerization activity, and can provide polymers having improved bulk density, by reacting magnesium alkoxide with an electron donor such as dialkyl phthalate, phthaloyl chloride and the like, and with a titanium chloride compound.

U.S. Pat. Nos. 4,347,158, 4,422,957, 4,425,257, 4,618,661 and 4,680,381 describe methods for preparing a catalyst, wherein a catalyst is prepared by adding Lewis acids such as aluminum chloride to a magnesium chloride support and then pulverizing the resultant. Although catalytic activity has been complemented in the above-listed patents, they still have problems such that catalyst morphology such as shape, size and size distribution of a catalyst is irregular, and stereoregularity needs to be enhanced.

U.S. Pat. No. 5,459,116 describes a catalyst which can provide high polymerization activity and polymers having bulk density, wherein the catalyst is prepared by contact-reacting a magnesium compound solution containing esters having at least one hydroxyl group as an electron donor with a titanium compound, resulting in a supported solid titanium catalyst. However, it still needs to be improved in terms of particle morphology.

TECHNICAL PROBLEM

As reviewed so far, it is necessary to develop a novel catalyst for ethylene (co)polymerization, which can be prepared through a simple process, and can provide high polymerization activity and polymers having high bulk density owing to its easily adjustable particle shape and size.

TECHNICAL SOLUTION

The object of the present invention is to provide a novel preparation method of a catalyst for ethylene (co)polymerization which has high catalytic activity and can provide polymers having high bulk density by regulating the shape, particle size and size distribution of the catalyst. Specifically, the present invention is to provide a preparation method of a solid catalyst component for ethylene (co)polymerization in simple and effective way, which can adjust the shape of the catalyst and provide very high bulk density.

The method of preparing a catalyst for ethylene (co)polymerization according to the present invention is characterized by comprising the following steps:

(1) preparing a magnesium compound solution by contact-reacting a halogenated magnesium compound with a mixed solvent of cyclic ether and at least one alcohol;

(2) reacting the resulted magnesium compound solution from the above step (1) with a silicon compound having at least one alkoxy group;

(3) preparing a support by adding a titanium compound represented by a general formula (I) to the resulted product from the step (2):

$$Ti(OR)_a X_{(4-a)} \qquad (I)$$

[wherein R is an alkyl group having $C_{1-10}$; X is a halogen atom; and a is an integer of 0-4]; and (4) reacting the obtained support with titanium compound having a general formula (I) as represented above and optionally, a monoester compound, resulting in a catalyst.

As for the halogenated magnesium compound in the step (1) for preparation of a magnesium compound solution, at least one or two compounds selected from the group consisting of, for example: dihalogenated magnesium such as magnesium chloride, magnesium iodide, magnesium fluoride and magnesium bromide; alkyl magnesium halides such as methyl magnesium halide, ethyl magnesium halide, propyl magnesium halide, butyl magnesium halide, isobutyl magnesium halide, hexyl magnesium halide and amyl magnesium halide; alkoxy magnesium halides such as methoxy magnesium halide, ethoxy magnesium halide, isopropoxy magnesium halide, butoxy magnesium halide and octoxy magnesium halide; and aryloxy magnesium halides such as phenoxy magnesium halide and methylphenoxy magnesium halide, or magnesium complex compounds with other metals may be used.

Although the above-listed compounds can be represented as a simple chemical formula, in some other cases, some compounds are not possible to be represented as a simple formula, depending on the preparation method of a magnesium compound. In such case, it may be considered as a mixture of generally listed magnesium compounds. For example, a compound obtained by reacting a magnesium compound with a polysiloxane compound, a halogen-containing silane compound, an ester, an alcohol and the like, and a compound obtained by reacting magnesium metal with halosilane or with alcohol, phenol or ether in the presence of thionyl chloride, also may be used in the present invention. Preferred are magnesium halides, particularly magnesium chloride, alkyl magnesium chlorides, preferably having an alkyl group of $C_1$-$C_{10}$, alkoxy magnesium chlorides, preferably having an alkoxy group of $C_1$-$C_{10}$, and aryloxy magnesium chlorides, preferably having an aryloxy group of $C_6$-$C_{10}$.

In the step (1) for preparation of a magnesium compound solution, when converting a magnesium compound to a magnesium compound solution, it is preferred to use a mixed solvent of cyclic ether and at least one alcohols. Cyclic ethers used herein are cyclic ethers having 3-6 carbon atoms in the ring and derivatives thereof. Particularly preferred are tetrahydrofuran and 2-methyl tetrahydrofuran, and the most preferred is tetrahydrofuran. Alcohols used herein may be monovalent or polyvalent alcohols having 1-20 carbon atoms, and preferably mentioned are alcohols having 2-12 carbon atoms.

The amount of the mixed solvent of cyclic ether and at least one alcohols used in the preparation of the magnesium compound solution, is preferably 1-20 moles based on one mole of the halogenated magnesium compound, and more preferably 2-10 moles. When the amount of use is less than 1 mole, dissolution of a magnesium compound can be hardly achieved, and when it is more than 20 moles, the amount of a titanium compound being inputted to obtain catalyst particles should be increased excessively, causing difficulties in regulating the particle size. Further, in the above mixed solvent, the molar ratio of cyclic ether to at least one alcohols(cyclic ether:alcohols) is preferably 1:0.05-1:0.95. When being out of said range, it is not preferred since preparation of a spherical-shaped catalyst is hardly achieved.

In the step (1) for preparation of the magnesium compound solution, the contact-reaction of a halogenated magnesium compound with a mixed solvent of cyclic ether and at least one type of alcohols, for preparing a magnesium compound solution, is carried out in the presence or absence of a hydrocarbon solvent. The hydrocarbon solvents used herein may include aliphatic hydrocarbons such as pentane, hexane, heptane, octane, decane and kerosene; alicyclic hydrocarbons such as cyclohexane and methylcyclohexane; aromatic hydrocarbons such as benzene, toluene, xylene, ethylbenzene, cumene and cymene; or halogenated hydrocarbons such as dichloropropane, dichloroethylene, trichloroethylene, carbon tetrachloride and chlorobenzene.

In the step (1) for preparation of the magnesium compound solution, although the dissolution temperature for preparing a magnesium compound solution may vary depending on the types and amounts of cyclic ether and alcohols, it is preferably dissolved at a temperature in the range of room temperature-200° C., more preferably about 50° C.-150° C.

As for the silicon compounds having at least one alkoxy group, in the step (2) of reacting a magnesium compound solution with a silicon compound, preferred are compounds having a general formula of $R_nSi(OR^1)_{4-n}$, wherein R and $R^1$ are independently hydrocarbon having $C_{1-12}$, and n is an integer of 0-3. Specifically, dimethyldimethoxy silane, dimethyldiethoxy silane, diphenyldimethoxy silane, methylphenyldimethoxy silane, diphenyldlethoxy silane, ethyltrimethoxy silane, vinyltrimethoxy silane, methyltrimethoxy silane, phenyltrimethoxy silane, methyltriethoxy silane, ethyltriethoxy silane, vinyltriethoxy silane, butyltriethoxy silane, phenyltriethoxy silane, ethyltriisopropoxy silane, vinyltributoxy silane, ethyl silicate, butyl silicate, methyltriaryloxy silane and the like may be used. The amount of the silicon compounds having at least one alkoxy group used herein is preferably 0.005-3 moles based on one mole of the halogenated magnesium compound, and more preferably 0.05-2 moles. When the amount of the silicon compounds having at least one alkoxy group is out of said range, it is not preferred since a desired shape of a support cannot be obtained.

In the step (2) of reacting a magnesium compound solution with a silicon compound having at least one alkoxy group, the temperature of the contact-reaction between the magnesium compound solution obtained from the step (1) and the silicon compound having at least one alkoxy group is preferably 0-100° C., and more preferably 10-70° C.

In the step (3) for preparation of a support, a titanium compound represented by a general formula (I) shown below is added to the products from the step (2) at a temperature of 20-50° C. Then, the temperature is elevated and the mixture is aced, resulting in solid particles which are used as supports:

$$Ti(OR)_aX_{(4-a)} \qquad (I)$$

wherein, R is an alkyl group having 1-10 carbon atoms; X is a halogen atom; and a is an integer of 0-4.

As for the titanium compounds satisfying the above general formula (I), for example, tetrahalogenated titanium such as $TiCl_4$, $TiBr_4$ and $TiI_4$; trihalogenated alkoxytitanium such as $Ti(OCH_3)Cl_3$, $Ti(OC_2H_5)Cl_3$, $Ti(OC_2H_5)Br_3$ and $Ti(O(i-C_4H_9)Br_3$; dihalogenated alkoxytitanium such as $Ti(OCH_3)_2Cl_2$, $Ti(OC_2H_5)_2Cl_2$, $Ti(O(i-C_4H_9))_2Cl_2$ and $Ti(OC_2H_5)_2Br_2$; tetraalkoxy titanium such as $Ti(OCH_3)_4$, $Ti(OC_2H_5)_4$ and $Ti(OC_4H_9)_4$; or mixtures thereof may be used. Preferred titanium compound is titanium tetrachloride.

The amount of a titanium compound used in the step (3) for preparation of a support, is preferably 0.1-500 moles based on one mole of the halogenated magnesium compound; more preferably 0.1-300 moles, and most preferably 0.2-200 moles. When the amount of a titanium compound is out of said range, it is not preferred since a desired shape of a support cannot be obtained. When reacting a magnesium compound solution with a titanium compound, the shape and size of the recrystallized solid components are varied depending on the reaction condition. Therefore, the reaction between a magnesium compound solution and a titanium compound is to be carried out at a suitable temperature so as to produce a solid component. Preferably, the contact-reaction is carried out at a temperature in the range of 10-70° C., and more preferably 20-50° C. After the contact-reaction, the reaction temperature is gradually elevated, so that the reaction can be further sufficiently carried out in the temperature range of 50-150° C. for 0.5-5 hours.

In the step (4) of catalyst preparation, the support obtained from the step (3) is allowed to react with either of a titanium compound, or a titanium compound and a monoester compound, to prepare the catalyst. The reaction may be completed through once, or twice or three times or more of reactions, and it is desirably determined by considering catalyst performance, material input and the economical efficiency of the reaction.

As for the titanium compound used in the step (4), titanium compounds represented by the general formula (I) as shown below is preferred

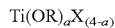 (I)

wherein, R is an alkyl group having 1-10 carbon atoms; X is a halogen atom; and a is an integer of 0-4.

As for the titanium compounds satisfying the above general formula (I), for example, tetrahalogenated titanium such as $TiCl_4$, $TiBr_4$ and $TiI_4$; trihalogenated alkoxytitanium such as $Ti(OCH_3)Cl_3$, $Ti(OC_2H_5)Cl_3$, $Ti(OC_2H_5)Br_3$ and $Ti(O(i-C_4H_9))Br_3$; dihalogenated alkoxytitanium such as $Ti(OCH_3)_2Cl_2$, $Ti(OC_2H_5)_2Cl_2$, $Ti(O(i-C_4H_9))_2Cl_2$ and $Ti(OC_2H_5)_2Br_2$; tetraalkoxy titanium such as $Ti(OCH_3)_4$; $Ti(OC_2H_5)_4$ and $Ti(OC_4H_9)_4$; or mixtures thereof may be used. Preferred titanium compound is titanium tetrachloride. The amount of the titanium compound, is preferably 0.5-1000 moles based on one mole of the halogenated magnesium compound, and most preferably 1-500 moles. In this range, it is possible to obtain a catalyst having the most excellent catalytic performance.

The monoester compounds optionally used in the above step (4) collectively refer to organic compounds having one ester group represented by a general formula of $R^1COOR^2$, wherein $R^1$ and $R^2$ are independently an alkyl or aromatic group having $C_{1-25}$, respectively. For example, alkyl aromatic esters and derivatives thereof such as ethylbenzoate, ethylbromobenzoate, butylbenzoate, isobutylbenzoate, hexylbenzoate, cyclohexylbenzoate and the like may be mentioned. The amount of the monoester compounds used herein is preferably 0.01-500 moles based on one mole of the halogenated magnesium compound, and more preferably 0.1-50 moles. When being out of said range, it is not preferred since a catalyst having the most excellent catalytic performance cannot be obtained.

Catalysts prepared by the steps (1)-(4) of the method according to the present invention are advantageously used in ethylene (co)polymerization. Particularly the catalysts may be used in ethylene homopolymerization or copolymerization of ethylene with α-olefins having 3 or more carbon atoms such as propylene, 1-butene, 1-pentene, 4-methyl-1-pentene and 1-hexene. Polymerization is carried out by using a catalyst system comprising (i) a solid complex titanium catalyst comprising magnesium, titanium, halogen and an electron donor, prepared by the above-described method according to the present invention and (ii) an organometallic compound from Group II or III of the Periodic table.

The solid complex titanium catalyst (i) of the present invention can be used as being pre-polymerized with ethylene or α-olefins before being used as a component in polymerization process. Pre-polymerization makes a catalyst particle surrounded by polymers, thus maintaining the catalyst shape and helping the improvement of polymer morphology after polymerization Pre-polymerization may be carried out with the catalyst component as mentioned above and an organoaluminium compound such as triethylaluminum, at a sufficiently low temperature and under ethylene or α-olefin pressure, in the presence of a hydrocarbon solvent such as hexane. After pre-polymerization, the weight ratio of polymer:catalyst is approximately 0.1:1-60:1.

The general formula of the organometallic compound (II) is $MR_n$, wherein M is a metal component from Group II or III of the Periodic table such as magnesium, calcium, zinc, boron, aluminum and gallium; R is an alkyl group having $C_{1-20}$ such as methyl, ethyl, butyl, hexyl, octyl and decyl; and n is an atomic valence of the metal component. As for the organometallic compounds, trialkyl aluminums having an alkyl group with $C_{1-6}$ such as triethylaluminum and triisobutylaluminum, and mixtures thereof may be advantageously used. In some cases, organoaluminum compounds having at least one halogen or hydride group, such as ethylaluminum dichloride, diethylaluminum chloride, ethylaluminum sesquichloride or diisobutylaluminum hydride may be used.

Polymerization in the presence of the catalyst of the present invention can be carried out by gas phase or bulk polymerization in the absence of an organic solvent, or liquid phase slurry polymerization in the presence of an organic solvent. The polymerization methods can be conducted in the absence of oxygen, water and other compounds that could act as a catalyst poison. In the case of liquid phase slurry polymerization, the desired concentration of the solid complex titanium catalyst (i) of the present invention in the polymerization system is about 0.001-5 mmols in terms of titanium atom in the catalyst, relative to 1 L of solvent, preferably about 0.001-0.5 mmols. Preferred solvents include: alkanes such as pentane, hexane, heptane, n-octane and isooctane; cycloalkanes such as cyclohexane and methylcyclohexane; alkylaromatic compounds such as toluene, xylene, ethyl benzene, isopropyl benzene, ethyl toluene, n-propyl benzene and diethyl benzene; halogenated aromatic compounds such as chlorobenzene, chloronaphthalene and ortho-dichlorobenzene; and mixtures thereof. In the case of gas phase polymerization, a desired amount of the solid complex titanium catalyst (i) of the present invention is 0.001-5 mmols in terms of titanium atom in the catalyst, relative to IL of polymerization volume, preferably about 0.001-1.0 mmols, and most preferably about 0.01-0.5 mmols. The desired concentration of the organometallic compound (ii) in said polymerization is about 1-2000 moles in terms of aluminum atom, based on one mole of titanium atom in the catalyst (i) according to the present invention, more preferably about 5-500 moles.

When polymerization is carried out at a high temperature, regardless of the polymerization process used, a high speed of polymerization can be obtained. Generally, the polymerization temperature is preferably about 20-200° C., and more preferably 20-95° C. In polymerization, the pressure of monomers is preferably in the range of atmospheric pressure-100 atms, and more preferably 2-50 atms.

ADVANTAGEOUS EFFECT

By the method of the present invention, it is possible to obtain a catalyst having high catalytic activity at high yield, and by using the catalyst in polymerization ethylene homopolymer or copolymer having high bulk density and uniform particle size distribution can be obtained.

MODE FOR INVENTION

Hereinafter, the present invention is further illustrated through the following examples and comparative examples. However, theses examples have only illustrative purpose and by no means limit the present invention.

EXAMPLES AND COMPARATIVE EXAMPLES

Example 1

In this example, the yield of catalyst production is represented by percentage (%) of the weight of the resulted catalyst in relation to the weight of initially inputted $MgCl_2$.

The size distribution of catalyst was measured by using a laser particle analyzer (Mastersizer X, Malvern Instruments). In the results, the average size is expressed as $D(v,0.5)$, and the size distribution is expressed as $(D(v,0.9)-D(v,0.1))/D(v,0.5)$, wherein $D(v,0.5)$ indicates a particle size shown by 50% of samples, and $D(v,0.9)$ and $D(v,0.1)$ indicate the sizes shown by 90% of samples and 10% of samples, respectively. The smaller the measured value of the distribution is, the narrower the distribution will be. The composition of a catalyst was analyzed by ICP.

(i) Step of Preparing a Magnesium Compound Solution

To a 10 L reactor, of which atmosphere had been substituted with nitrogen, equipped with a mechanical stirrer, $MgCl_2$ 230 g, toluene 2800 mL, tetrahydrofuran 240 mL, and butanol 710 mL were added. Then, the mixture was stirred at the speed of 550 rpm while elevating the temperature to 110° C., and it was maintained for 3 hours to obtain a homogenous solution.

(ii) Step of Contact-Reaction Between a Magnesium Compound Solution and an Alkoxy Silane Compound The magnesium compound solution obtained from the above step (i) was cooled to 70° C., and then thereto silicon tetraethoxide was added at the molar ratio of silicon tetraethoxide/$MgCl_2$=0.15 and allowed to react for 1 hour.

(iii) Step of Preparing a Solid Support

The magnesium compound solution resulted from the above step (ii) was cooled to 35° C., and $TiCl_4$ 415 mL was added thereto over 80 minutes. Then the temperature of the reactor was raised to 60° C. over 1 hour and the mixture was aged for 1 hour. After the reaction, the mixture was allowed to stand for 30 minutes so that supports can be settled down, and then the upper part of the solution was removed. The slurry remained in the reactor was washed by repeating the following steps 3 times: adding hexane 3000 mL; stirring the mixture and then allowing it to stand still; and removing the supernatant thereof.

(iv) Step of Preparing a Catalyst

The support obtained from the step (iii) was placed together with toluene 1600 mL into a reactor at 5° C. At the stirring speed of 250 rpm, $TiCl_4$ 1400 mL was added to the mixture, and then the temperature of the reactor was elevated to 70° C. over 1 hour and aged for 2 hours. Then, it was stood still for 30 minutes so as to precipitate, and the supernatant was removed. Thus obtained catalyst slurry was washed 7 times with 1600 mL of purified hexane. The Ti content in the resulted catalyst was 3.2% by weight (wt %).

[Polymerization]

A 2 L volume autoclave was dried in an oven and assembled while it is still hot. Then, the atmosphere inside the reactor was substituted with nitrogen by applying nitrogen and vacuum 3 times in alternate way. 1000 ml of n-hexane was injected into the reactor and then 2 mmols of triethylaluminum and 1000 ml of hydrogen were injected. The temperature of the reactor was elevated to 80° C. while stirring at 710 rpm, and the ethylene pressure was adjusted to 120 psig. Then, the above catalyst was infected at the amount of 0.03 mmols based on the titanium atom. Polymerization was carried out for 1 hour. Upon completion of polymerization, the reactor temperature was lowered to room temperature, and excessive ethanol was added to the polymerized products. Thus produced polymers were collected and dried in a vacuum oven for at least 6 hours, obtaining polyethylene as white powder.

Polymerization activity (kg polyethylene/g catalyst) was calculated as the ratio of the weight of the resulted polymers (Kg) to the amount of catalyst used (g). The polymerization results as well as bulk density (g/ml) of the polymer were represented in Table 1.

Example 2

Catalyst preparation and polymerization were carried out by using the same method as in Example 1, except that in the step (ii), silicon tetraethoxide was added at the molar ratio of silicon tetraethoxide/$MgCl_2$ of 0.10 and allowed to react for 1 hour. The results of this example 2 were shown in Table 1.

Example 3

Catalyst preparation and polymerization were carried out by using the same method as in Example 1, except that in the step (ii), silicon tetraethoxide was added at the molar ratio of silicon tetraethoxide/$MgCl_2$ of 0.05 and allowed to react for 1 hour. The results of this example 3 were shown in Table 1.

Example 4

Catalyst preparation and polymerization were carried out by using the same method as in Example 1, except that in the step (ii), silicon tetramethoxide, instead of silicon tetraethoxide, was added at the molar ratio of silicon tetramethoxide/$MgCl_2$ of 0.10 and allowed to react for 1 hour. The results of this example 4 were shown in Table 1.

Example 5

Catalyst preparation and polymerization were carried out by using the same method as in Example 1, except that in the step (ii) silicon tetrabutoxide, instead of silicon tetraethoxide, was added at the molar ratio of silicon tetrabutoxide/$MgCl_2$ of 0.10 and allowed to react for 1 hour. The results of this example 5 were shown in Table 1.

Example 6

Catalyst preparation and polymerization were carried out by using the same method as in Example 1, except that in the step (iv): adding $TiCl_4$ 1400 mL; elevating the reactor temperature to 25° C. over 1 hour; slowly inputting ethylbenzoate 55 mL at 25° C.; elevating the reactor temperature to 70° C. over 1 hour; aging it for 2 hours; allowing it to stand still for 30 minutes so as to precipitate; separating the supernatant; and washing the resulted catalyst slurry 7 times with 1600 mL of purified hexane. The results of this example 6 were shown in Table 1.

Example 7

Catalyst preparation and polymerization were carried out by using the same method as in Example 6, except that in the step of (iv), 37 mL of ethylbenzoate was added. The results of this example 7 were shown in Table 1.

Example 8

Catalyst preparation and polymerization were carried out by using the same method as in Example 6, except that in the step (iv), 18 mL of ethylbenzoate was added. The results of this example 8 were shown in Table 1.

Example 9

Catalyst preparation and polymerization were carried out by using the same method as in Example 6, except that in the step (iv), 42 mL of butylbenzoate, instead of ethylbenzoate, was added. The results of this example 9 were shown in Table 1.

Example 10

Catalyst preparation and polymerization were carried out by using the same method as in Example 6, except that in the step (iv), 21 mL of butylbenzoate, instead of ethylbenzoate, was added. The results of this example 10 were shown in Table 1.

Comparative Example 1

Catalyst preparation and polymerization were carried out by using the same method as in Example 1, except that in the step (ii) the reaction was carried out without using silicon tetraethoxide. The results of this comparative example 1 were shown in Table 1.

Comparative Example 2

Catalyst preparation and polymerization were carried out by using the same method as in Example 1, except that in the step (i), 960 mL of tetrahydrofuran was used and butanol was not used. The results of this comparative example 2 were shown in Table 1.

Comparative Example 3

Catalyst preparation and polymerization were carried out by using the same method as in Example 6, except that in the step (ii), the reaction was carried out without using silicon tetraethoxide. The results of this comparative example 3 were shown in Table 1.

Comparative Example 4

(i) Step 2 of Preparing a Magnesium Compound Solution

To a 1.0 L reactor, of which atmosphere had been substituted with nitrogen, equipped with a mechanical stirrer, $MgCl_2$ 95 g, toluene 4000 mL were added and stirred at the speed of 300 rpm. Then, 2-ethyl hexanol 620 mL was added thereto and the temperature was elevated to 120° C. It was allowed to react for 3 hours so as to obtain a homogenous solution, which was cooled to 70° C.

(ii) Step of Contact-Reacting a Magnesium Compound Solution with Alkoxy Silane Compound The magnesium compound solution obtained from the above step (i), was cooled to 70° C., and then 100.0 ml of silicon tetraethoxide was added thereto. The mixture was allowed to react for 1 hour.

(iii) Step 2 of Preparing Catalyst

The temperature of the magnesium compound solution, which is the product of the step (ii), was adjusted to room temperature (25° C.), and thereto $TiCl_4$ 600 ml was added dropwise over 1 hour. When completing the addition, the reactor temperature was elevated to 70° C. over 1 hour, and the elevated temperature was maintained for 1 hour. After halting stirring, the supernatant was removed and 3000 ml of toluene and 1000 ml of $TiCl_4$ were continuously inputted to the remained solid phase. The temperature was elevated to 100° C., and maintained for 2 hours. After reaction, the reactor was cooled to room temperature, and it was washed with 400 ml of hexane until unreacted free $TiCl_4$ was removed. The titanium content of the resulted solid catalyst was 3.7 wt %. With the obtained catalyst, polymerization was carried out, and the results were represented in Table 1.

Comparative Example 5

Catalyst preparation and polymerization were carried out by using the same method as in Comparative example 4, except that in the step (ii) of Comparative example 4, the reaction was carried out for 1 hour without using silicon tetraethoxide. The results of this comparative example 5 were shown in Table 1.

Comparative Example 6

Catalyst preparation and polymerization were carried out by using the same method as in Comparative example 4, except that in the step (iii) of Comparative example 4, 30 ml of ethyl benzoate was further added after addition of $TiCl_4$. The results of this comparative example 6 were shown in Table 1.

Comparative Example 7

Catalyst preparation and polymerization were carried out by using the same method as in Comparative example 6, except that in the step (ii) of Comparative example 6, the reaction was carried out without using silicon tetraethoxide for 1 hour. The results of this comparative example 7 were shown in Table 1.

TABLE 1

| | Yield (%) | Average size of catalyst (μm) | Size distribution of catalyst | Polymerization activity (kgPE/g catalyst) | Bulk density (g/ml) |
|---|---|---|---|---|---|
| Example 1 | 124 | 6.4 | 0.82 | 17.2 | 0.33 |
| Example 2 | 122 | 5.7 | 0.79 | 17.9 | 0.32 |
| Example 3 | 126 | 5.5 | 0.80 | 16.9 | 0.32 |
| Example 4 | 125 | 6.5 | 0.72 | 18.2 | 0.34 |
| Example 5 | 123 | 5.8 | 0.77 | 16.6 | 0.34 |
| Example 6 | 132 | 6.4 | 0.82 | 14.2 | 0.39 |
| Example 7 | 131 | 5.7 | 0.79 | 17.9 | 0.38 |
| Example 8 | 130 | 5.5 | 0.80 | 22.9 | 0.37 |
| Example 9 | 133 | 6.5 | 0.72 | 19.2 | 0.38 |
| Example 10 | 129 | 5.8 | 0.77 | 21.6 | 0.36 |
| Com. Example 1 | 120 | 6.8 | 1.2 | 15.4 | 0.28 |
| Com. Example 2 | 120 | 7.7 | 3.5 | 12.7 | 0.25 |
| Com. Example 3 | 109 | 6.6 | 1.2 | 13.4 | 0.29 |
| Com. Example 4 | 115 | 8.9 | 1.5 | 14.8 | 0.29 |
| Com. Example 5 | 110 | 6.5 | 3.9 | 16.2 | 0.23 |

TABLE 1-continued

|  | Yield (%) | Average size of catalyst (μm) | Size distribution of catalyst | Polymerization activity (kgPE/g catalyst) | Bulk density (g/ml) |
|---|---|---|---|---|---|
| Com. Example 6 | 112 | 8.8 | 1.7 | 11.8 | 0.31 |
| Com. Example 7 | 113 | 6.4 | 3.5 | 13.2 | 0.25 |

*) size distribution of catalyst = (D(v, 0.9) − D(v, 0.1))/D(v, 0.5)

As seen from above Table 1, by using a catalyst prepared by the method of the present invention in polymerization, it is possible to obtain a catalyst having high catalytic activity at high yield, and ethylene homopolymer or copolymer having high bulk density and uniform particle size distribution.

What is claimed is:

1. A method of preparing a catalyst for ethylene polymerization or copolymerization, characterized by comprising the following steps:
   (1) preparing a magnesium compound solution by contact-reacting a halogenated magnesium compound with a mixed solvent of cyclic ether and at least one alcohol;
   (2) reacting the resulted magnesium compound solution from the above step (1) with a silicon compound having at least one alkoxyl group;
   (3) preparing a support by adding a titanium compound represented by a general formula (I) to the resulted product from the step (2):

$Ti(OR)_a X_{(4-a)}$ (I)

wherein R is an alkyl group having $C_{1-10}$; X is a halogen atom; and a is an integer of 0-4; and
   (4) reacting the obtained support with a titanium compound and a monoester compound represented by a general formula of $R^1COOR^2$, wherein $R^1$ and $R^2$ are independently an alkyl or aromatic group having $C_{1-25}$, resulting in a catalyst.

2. The method according to claim 1, wherein, in the step (1), the cyclic ether is tetrahydrofuran or 2-methyl tetrahydrofuran, and the alcohol is a mono- or polyvalent alcohol having 1-20 carbon atoms.

3. The method according to claim 1, wherein the amount of the mixed solvent in step (1) is 1-20 moles based on one mole of the halogenated magnesium compound.

4. The method according to claim 1, wherein the silicon compound having at least one alkoxy group in the step (2) has a general formula of $R_n Si(OR^1)_{4-n}$, wherein R and $R^1$ are independently hydrocarbon having $C_{1-12}$, and n is an integer of 0-3.

5. The method according to claim 1, wherein the amount of the monoester compound is 0.01-500 moles based on one mole of the halogenated magnesium compound.

6. The method according to claim 1, wherein, in the step (1), the cyclic ether is tetrahydrofuran or 2-methyl tetrahydrofuran, and the alcohol is a mono- or polyvalent alcohol having 1-20 carbon atoms.

7. The method according to claim 1, wherein the amount of the mixed solvent in step (1) is 1-20 moles based on one mole of the halogenated magnesium compound.

8. The method according to claim 1, wherein the silicon compound having at least one alkoxy group in the step (2) has a general formula of $R_n Si(OR^1)_{4-n}$, wherein R and $R^1$ are independently hydrocarbon having $C_{1-12}$, and n is an integer of 0-3.

* * * * *